(12) United States Patent
Nagasawa et al.

(10) Patent No.: US 11,762,160 B2
(45) Date of Patent: Sep. 19, 2023

(54) SUBMARINE DEVICE, METHOD OF CONFIGURING SUBMARINE DEVICE, AND SUBMARINE CABLE SYSTEM

(71) Applicants: NEC Corporation, Tokyo (JP); NEC Platforms, Ltd., Kawasaki (JP)

(72) Inventors: Toshihide Nagasawa, Tokyo (JP); Akihiro Tanaka, Kanagawa (JP)

(73) Assignees: NEC CORPORATION, Tokyo (JP); NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 17/912,234

(22) PCT Filed: Feb. 3, 2021

(86) PCT No.: PCT/JP2021/003978
§ 371 (c)(1),
(2) Date: Sep. 16, 2022

(87) PCT Pub. No.: WO2021/199663
PCT Pub. Date: Oct. 7, 2021

(65) Prior Publication Data
US 2023/0204886 A1    Jun. 29, 2023

(30) Foreign Application Priority Data
Mar. 30, 2020   (JP) ................................. 2020-059951

(51) Int. Cl.
*G02B 6/50* (2006.01)
*G02B 6/44* (2006.01)
*G02B 6/38* (2006.01)

(52) U.S. Cl.
CPC ......... *G02B 6/4431* (2023.05); *G02B 6/3878* (2013.01); *G02B 6/506* (2013.01)

(58) Field of Classification Search
CPC ............................. G02B 6/4431; G02B 6/506
See application file for complete search history.

(56) References Cited

U.S. PATENT DOCUMENTS

| | | | |
|---|---|---|---|
| 5,125,060 | A | 6/1992 | Edmundson |
| 2017/0343759 | A1 | 11/2017 | Kishimoto et al. |
| 2019/0187396 | A1 | 6/2019 | Finnegan et al. |

FOREIGN PATENT DOCUMENTS

| | | | | |
|---|---|---|---|---|
| EP | 3985689 A1 | * | 4/2022 | .......... G02B 6/4472 |
| JP | 57073702 A | * | 5/1982 | .......... G02B 6/4427 |

(Continued)

OTHER PUBLICATIONS

International Search Report for PCT Application No. PCT/JP2021/003978, dated Apr. 20, 2021.

*Primary Examiner* — Charlie Y Peng
(74) *Attorney, Agent, or Firm* — Sughrue Mion, PLLC

(57) ABSTRACT

In an aspect of the present disclosure, a submarine device includes a main tail cable connected to a submarine cable, a first branch tail cable including a first group of optical fibers among a plurality of optical fibers included in the main tail cable, a second branch tail cable including a second group of optical fibers among the plurality of optical fibers, a branch member that couples the main tail cable to the first and second branch tail cables and including therein a through hole for branching the plurality of optical fibers included in the main tail cable into the first group and the second group, and a device main body including a first introduction part for introducing the first branch tail cable into the device main body and a second introduction part for introducing the second branch tail cable into the device main body.

10 Claims, 5 Drawing Sheets

(56) References Cited

FOREIGN PATENT DOCUMENTS

| | | | |
|---|---|---|---|
| JP | S58-019043 A | | 2/1983 |
| JP | H05-142428 A | | 6/1993 |
| JP | H08-205375 A | | 8/1996 |
| JP | H0915465 A | * | 1/1997 |
| JP | 2005-215413 A | | 8/2005 |
| JP | 2017-215438 A | | 12/2017 |

* cited by examiner

SUBMARINE DEVICE, METHOD OF CONFIGURING SUBMARINE DEVICE, AND SUBMARINE CABLE SYSTEM

This application is a National Stage Entry of PCT/JP2021/003978 filed on Feb. 3, 2021, which claims priority from Japanese Patent Application 2020-059951 filed on Mar. 30, 2020, the contents of all of which are incorporated herein by reference, in their entirety.

TECHNICAL FIELD

The present disclosure relates to a submarine device, a method of configuring the submarine device, and a submarine cable system.

BACKGROUND ART

Submarine devices connected to submarine cables and installed on the seabed is known. Patent Literature 1 discloses a submarine relay apparatus, which is a submarine device that amplifies an optical signal of a submarine cable that has been attenuated during long-distance transmission. In addition to a submarine relay apparatus, a submarine branch apparatus and an earthquake and tsunami observation apparatus are known as the submarine device. In any submarine device, a structure of a tail cable connecting a submarine cable to a submarine device main body is the same.

CITATION LIST

Patent Literature

Patent Literature 1: Japanese Unexamined Patent Application Publication No. H08(1996)-205375

SUMMARY OF INVENTION

Technical Problem

As a transmission capacity of a submarine cable increases, it is necessary to increase the number of optical fibers included in the submarine cable. The submarine device disclosed in Patent Literature 1 is provided with one introduction part for introducing a tail cable connected to the submarine cable into the device main body.

The number of optical fibers that can be introduced into the device main body from one introduction part is limited for various reasons. Therefore, in order to increase the number of optical fibers, a possible option is to provide a plurality of introduction parts in the device main body.

However, it is difficult to branch one tail cable connected to a submarine cable into a plurality of tail cables.

In light of such a problem, an object of the present disclosure is to provide a submarine device capable of coping with an increase in a transmission capacity of a submarine cable.

Solution to Problem

In an example aspect of the present disclosure, a submarine device includes:
a main tail cable connected to a submarine cable;
a first branch tail cable including a first group of optical fibers among a plurality of optical fibers included in the main tail cable;
a second branch tail cable including a second group of optical fibers among the plurality of optical fibers;
a branch member configured to couple the main tail cable to the first and second branch tail cables and including therein a through hole for branching the plurality of optical fibers included in the main tail cable into the first group and the second group; and
a device main body including a first introduction part for introducing the first branch tail cable into the device main body and a second introduction part for introducing the second branch tail cable into the device main body.

In another example aspect of the present disclosure, a method of configuring a submarine device includes:
branching a main tail cable connected to a submarine cable into a first branch tail cable including a first group of optical fibers among a plurality of optical fibers included in the main tail cable and a second branch tail cable including a second group of optical fibers among the plurality of optical fibers through a branch member; and
introducing the first branch tail cable into a device main body through a first introduction part and introducing the second branch tail cable into the device main body through a second introduction part.

In another example aspect of the present disclosure, a submarine cable system includes:
a submarine cable; and
a submarine device connected to the submarine cable.
The submarine device includes:
a main tail cable connected to a submarine cable;
a first branch tail cable including a first group of optical fibers among a plurality of optical fibers included in the main tail cable;
a second branch tail cable including a second group of optical fibers among the plurality of optical fibers;
a branch member configured to couple the main tail cable to the first and second branch tail cables and including therein a through hole for branching the plurality of optical fibers included in the main tail cable into the first group and the second group; and
a device main body including a first introduction part for introducing the first branch tail cable into the device main body and a second introduction part for introducing the second branch tail cable into the device main body.

Advantageous Effects of Invention

According to the present disclosure, it is possible to provide a submarine device capable of coping with an increase in a transmission capacity of a submarine cable.

EXAMPLE EMBODIMENT

Hereinafter, specific example embodiments will be described in detail with reference to the drawings. In each drawing, the same or corresponding elements are denoted by the same reference signs, and repeated descriptions are omitted as necessary for clarity of description.

First Example Embodiment

<Configuration of Submarine Device)

Figure 1:
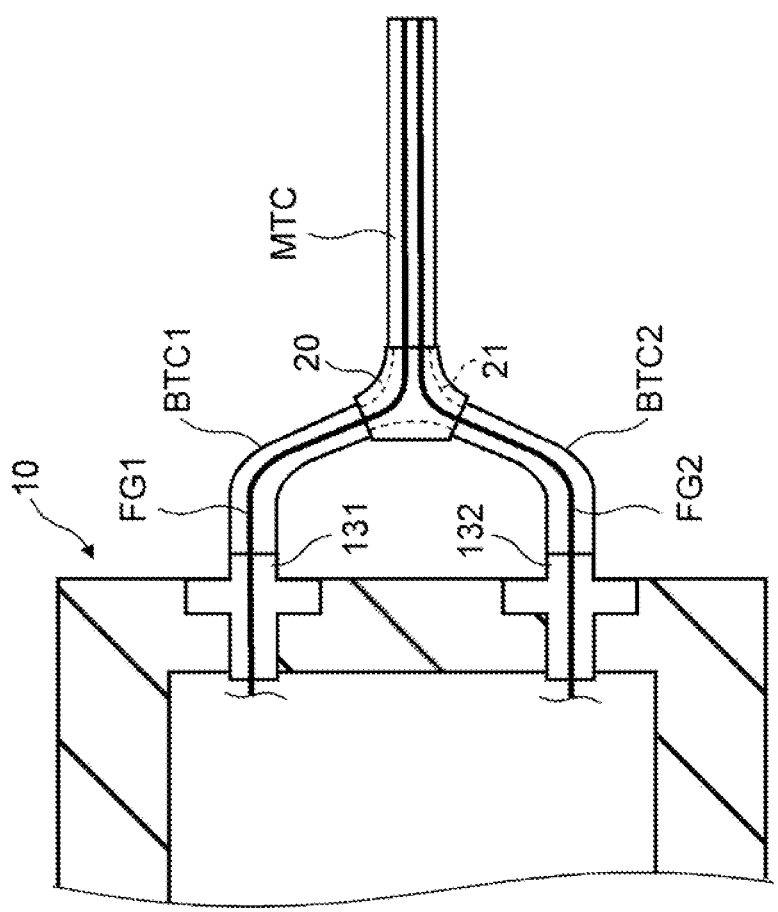
FIG. 1 is a schematic cross-sectional view showing a configuration of a submarine device according to a first example embodiment.

First, a configuration of a submarine device according to a first example embodiment will be described with reference to FIG. 1. FIG. 1 is a schematic cross-sectional view showing the configuration of the submarine device according to the first example embodiment.

As shown in FIG. 1, the submarine device according to the first example embodiment includes a device main body 10, a branch member 20, a main tail cable MTC, and branch tail cables BTC1 and BTC2.

The device main body 10 is a main body part of the submarine device. As shown in FIG. 1, the device main body 10 has an introduction part (a first introduction part) 131 for introducing the branch tail cable BTC1 and an introduction part (a second introduction part) 132 for introducing the branch tail cable BTC2.

One end of the main tail cable MTC is connected to a submarine cable (not shown in FIG. 1). The other end of the main tail cable MTC is coupled to the branch tail cables BTC1 and BTC2 through the branch member 20. The main tail cable MTC includes all optical fibers, i.e., optical fiber groups FG1 and FG2.

In FIG. 1, for ease of understanding, the optical fiber groups FG1 and FG2 inside the cable are shown by thick solid lines.

As shown in FIG. 1, one end of the branch tail cable (a first branch tail cable) BTC1 is coupled to the main tail cable MTC through the branch member 20. The other end of the branch tail cable BTC1 is introduced into the device main body 10 through the introduction part 131. The branch tail cable BTC1 includes the optical fiber group (a first optical fiber group) FG1.

As shown in FIG. 1, one end of the branch tail cable (a second branch tail cable) BTC2 is coupled to the main tail cable MTC through the branch member 20. The other end of the branch tail cable BTC2 is introduced into the device main body 10 through the introduction part 132. The branch tail cable BTC2 includes the optical fiber group (a second optical fiber group) FG2.

As shown in FIG. 1, the branch member 20 couples the main tail cable MTC to the branch tail cables BTC1 and BTC2. Further, the branch member 20 has therein a through hole 21 for branching a plurality of optical fibers included in the main tail cable MTC into the optical fiber groups FG1 and FG2.

The branch member 20, the main tail cable MTC, and the branch tail cables BTC1 and BTC2 constitute a tail cable.

As described above, in the submarine device according to the first example embodiment, one main tail cable MTC connected to the submarine cable is branched into the branch tail cable BTC1 including the optical fiber group FG1 and the branch tail cable BTC2 including the optical fiber group FG2 through the branch member 20. The branch tail cable BTC1 is introduced into the device main body 10 through the introduction part 131, and the branch tail cable BTC2 is introduced into the device main body 10 through the introduction part 132. That is, the optical fibers can be introduced into the device main body 10 through the plurality of introduction parts 131 and 132, and thus the optical fibers can cope with an increase in the transmission capacity of the submarine cable.

In the branch member 20 shown in FIG. 1, the plurality of optical fibers included in the main tail cable MTC are branched into two groups, and instead the plurality of optical fibers included in the main tail cable MTC may be branched into three or more groups. In this case, three or more introduction parts may be provided in the device main body 10 according to the number of branches.

Second Example Embodiment

<Configurations of Submarine Device and Submarine Cable System>

Figure 2:
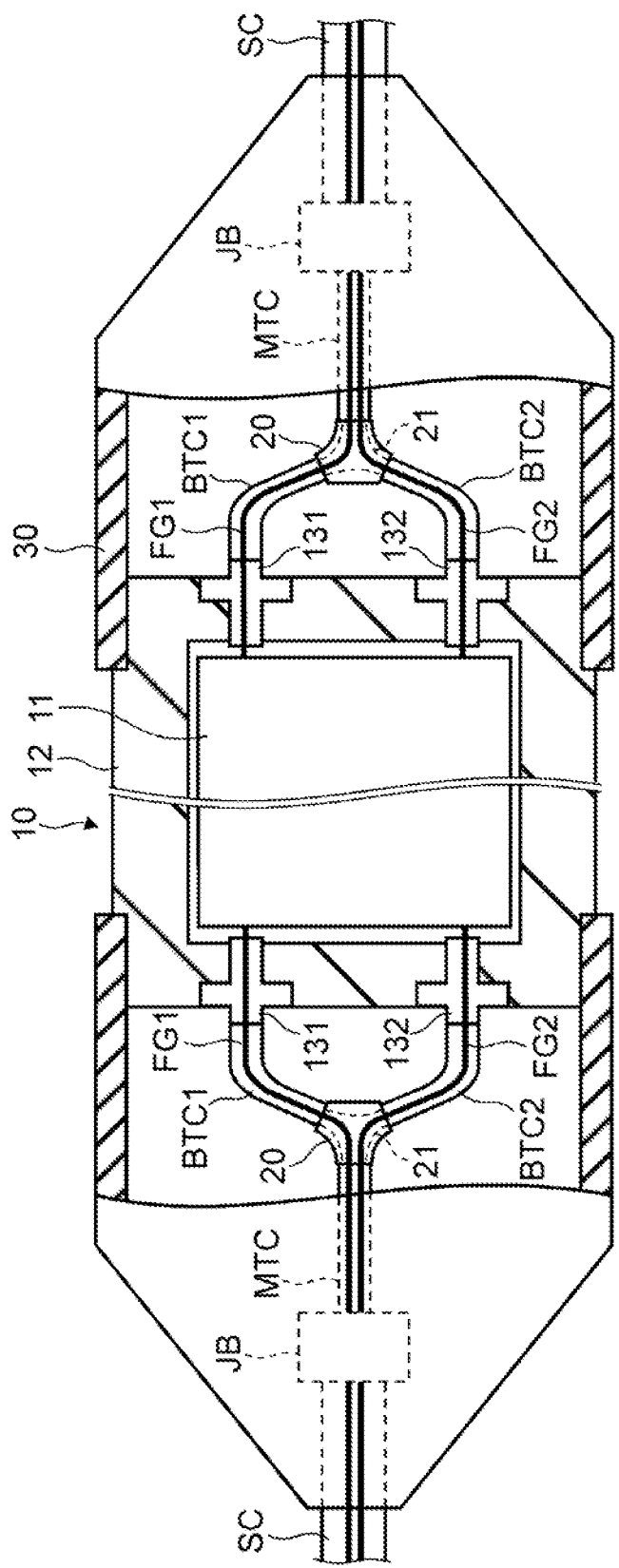
FIG. 2 is a schematic cross-sectional view showing a configuration of the submarine device and a submarine cable system according to a second example embodiment.

Next, configurations of a submarine device and a submarine cable system according to a second example embodiment will be described with reference to FIG. 2. FIG. 2 is a schematic cross-sectional view showing configurations of the submarine device and the submarine cable system according to the second example embodiment. The submarine device is, for example, a submarine relay apparatus, a submarine branch device, and an earthquake and tsunami observation apparatus.

As shown in FIG. 2, the submarine cable system according to the second example embodiment includes a submarine cable SC and a submarine device. The submarine device according to the second example embodiment includes joint boxes JB, and joint covers 30 in addition to a device main body 10, branch members 20, main tail cables MTC, and branch tail cables BTC1 and BTC2 shown in FIG. 1.

As shown in FIG. 2, the submarine device according to the second example embodiment includes the branch members 20, the main tail cables MTC, the branch tail cables BTC1 and BTC2, the joint boxes JB, and the joint covers 30 at both ends of the device main body 10 in a longitudinal direction. As shown in FIG. 2, both ends of the device main body 10 in the longitudinal direction have the same configuration, and thus the configuration of one end side will be described.

The device main body 10 is a main body part of the submarine device. As shown in FIG. 2, the device main body 10 has a configuration in which an internal unit 11 is accommodated in a cylindrical pressure-resistant housing 12. In the case of a submarine relay apparatus, the internal unit 11 includes, for example, circuitry for amplifying an optical signal of the submarine cable SC which has been attenuated during long distance transmission.

The pressure-resistant housing 12 is provided with an introduction part 131 for introducing the branch tail cable BTC1 into the internal unit 11 and an introduction part 132 for introducing the branch tail cable BTC2 into the internal unit 11. The pressure-resistant housing 12 has strength to withstand water pressure at a depth of 8000 m, and is made of, for example, beryllium copper alloy. Each of the pressure-resistant housing 12 and the introduction parts 131 and 132 has an airtight structure so that seawater does not enter the inside of the pressure-resistant housing 12 from the introduction parts 131 and 132.

As shown in FIG. 2, one end of the main tail cable MTC is connected to the submarine cable SC through the joint box JB. The other end of the main tail cable MTC is coupled to the branch tail cables BTC1 and BTC2 through the branch member 20.

Here, the main tail cable MTC has a configuration in which all optical fibers (i.e., the optical fiber groups FG1 and FG2 shown in FIG. 2) are accommodated in copper pipes. The copper pipes protect the optical fiber groups FG1 and FG2 and also function as power supply lines. In the joint box JB, the power supply lines and optical fibers of the submarine cable SC and the main tail cable MTC are connected to each other.

In FIG. 2, for ease of understanding, the optical fiber groups FG1 and FG2 inside the cables are shown by thick solid lines.

As shown in FIG. 2, one end of the branch tail cable BTC1 is coupled to the main tail cable MTC through the branch member 20. The other end of the branch tail cable BTC1 is introduced into the device main body 10 through the introduction part 131 and connected to the internal unit 11. The branch tail cable BTC1 includes an optical fiber group FG1.

As shown in FIG. 2, one end of the branch tail cable BTC2 is coupled to the main tail cable MTC through the branch member 20. The other end of the branch tail cable BTC2 is introduced into the device main body 10 through the introduction part 132 and connected to the internal unit 11. The branch tail cable BTC2 includes an optical fiber group FG2.

As shown in FIG. 2, the branch member 20 couples the main tail cable MTC to the branch tail cables BTC1 and BTC2. Further, the branch member 20 has therein a through hole 21 for branching a plurality of optical fibers included in the main tail cable MTC into the optical fiber groups FG1 and FG2.

The branch member 20, the main tail cable MTC, and the branch tail cables BTC1 and BTC2 constitute a tail cable.

Details of the branch member 20 will be described later.

As shown in FIG. 2, the joint cover 30 is a hollow member composed of a cylindrical part and a conical part. The cylindrical part accommodates the branch member 20, the main tail cable MTC, and the branch tail cables BTC1 and BTC2. The conical part accommodates the joint box JB. A diameter of the conical part is tapered toward the submarine cable SC side. One end of the joint cover 30 (i.e., one end of the cylindrical part) is fitted or screwed to and fixed to the pressure-resistant housing 12 of the device main body 10. The other end of the joint cover 30 (i.e., a leading end of the conical part) is opened to introduce the submarine cable SC. Seawater enters the inside of the joint cover 30.

As described above, the submarine device according to the second example embodiment also includes the branch member 20 for branching the plurality of optical fibers included in the main tail cable MTC into the optical fiber groups FG1 and FG2. Therefore, the optical fibers can be introduced into the device main body 10 through the plurality of introduction parts 131 and 132, and thus the optical fibers can cope with an increase in the transmission capacity of the submarine cable.

<Details of Branch Member 20>

Figure 3:
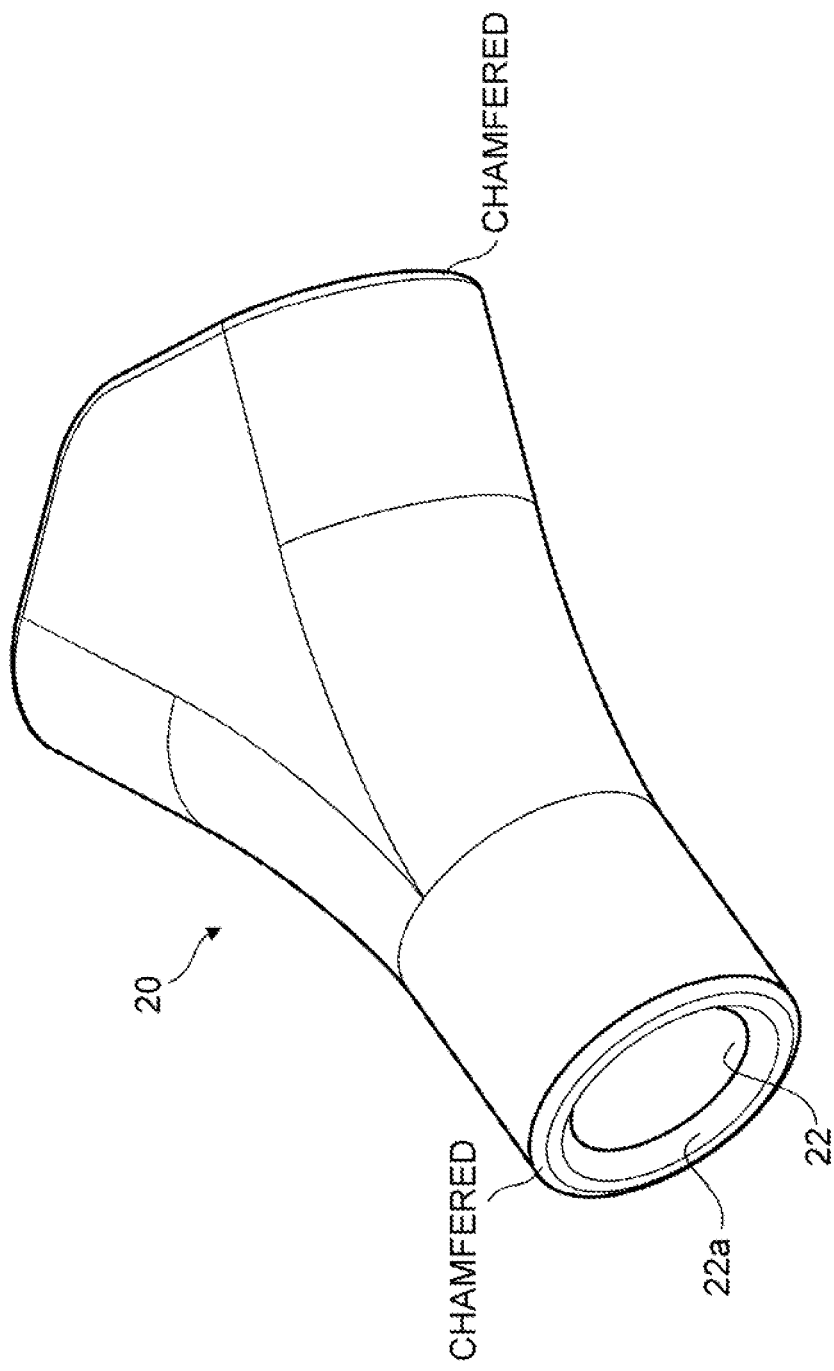
FIG. 3 is an external perspective view of a branch member 20.
Figure 4:
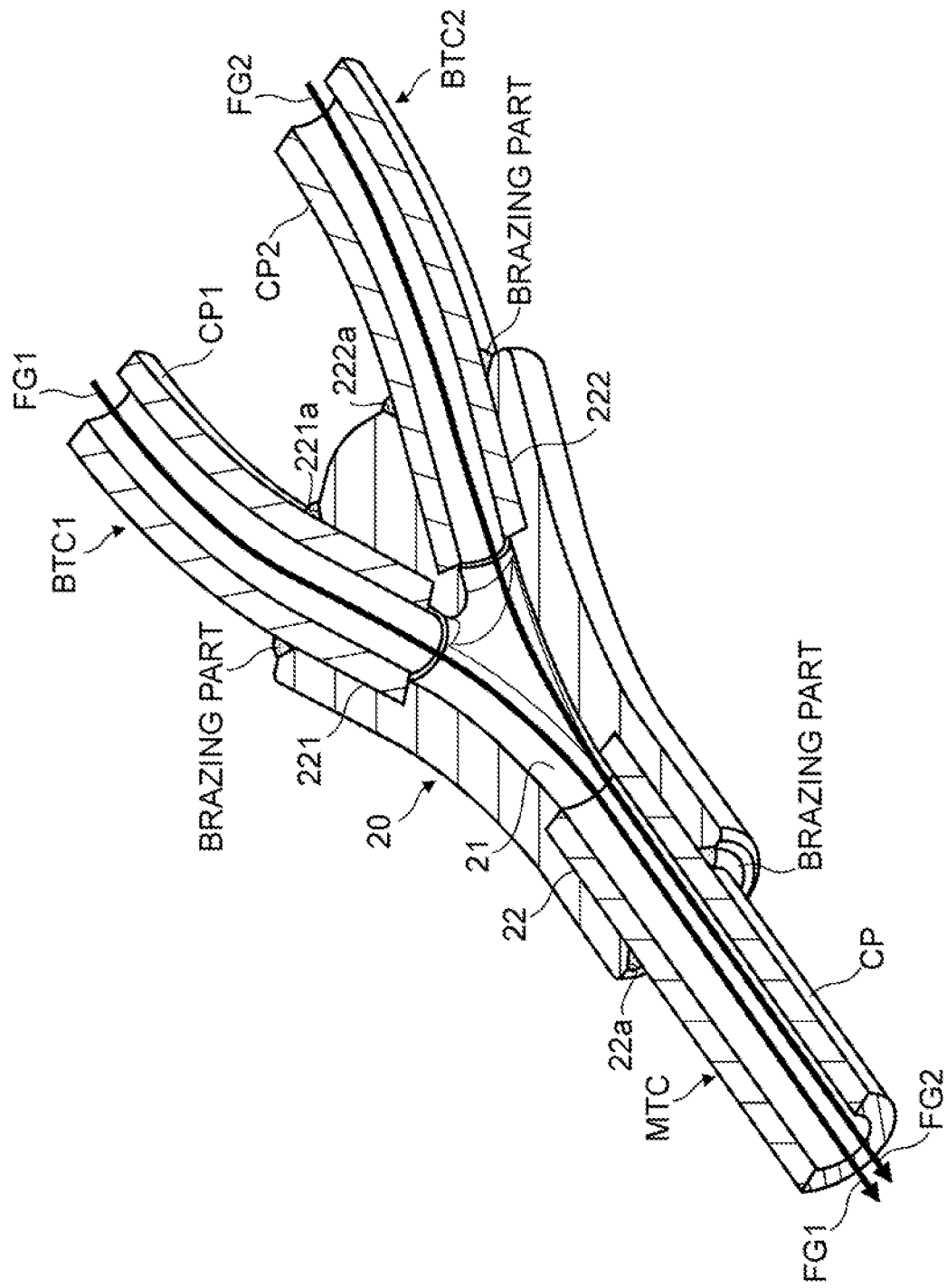
FIG. 4 is a cross-sectional perspective view of the branch member 20.

Next, the branch member 20 will be described in detail with reference to FIGS. 3 and 4. FIG. 3 is an external perspective view of the branch member 20. FIG. 4 is a cross-sectional perspective view of the branch member 20.

As shown in FIG. 4, a Y-shaped through hole 21 is formed in the branch member 20. Counterbored holes 22, 221, 222 having inner diameters larger than that of the through hole 21 are formed at three open ends of the Y-shaped through hole 21.

As shown in FIG. 4, one end part of a copper pipe CP constituting the main tail cable MTC is inserted into the counterbored hole 22 to a depth of, for example, several millimeters. As shown in FIG. 3, a tapered part 22a is formed at an open end of the counterbored hole 22 in such a way that a diameter thereof is expanded outward from an inner peripheral surface of the counterbored hole 22.

The tapered part 22a facilitates the insertion of the copper pipe CP into the counterbored hole 22 and brazing of the branch member 20 to the copper pipe CP. Specifically, as shown in FIG. 4, a gap between the tapered part 22a and the copper pipe CP is filled with a brazing material to form a ring-shaped brazing part.

As shown in FIG. 4, one end parts of the copper pipes CP1 and CP2 constituting the branch tail cables BTC1 and BTC2 are inserted into the counterbored holes 221 and 222, respectively, to a depth of, for example, several millimeters. In a manner similar the counterbored hole 22, tapered parts 221a and 222a are formed at the open ends of the counterbored holes 221 and 222, respectively, in such a way that the diameters thereof are expanded outward from the inner peripheral surface.

The tapered parts facilitate the insertion of the copper pipes CP1 and CP2 into the counterbored holes 221 and 222, respectively, and the brazing of the branch member 20 to the copper pipes CP1 and CP2. Specifically, as shown in FIG. 4, ring-shaped brazing parts are also formed at the tapered parts 221a and 222a of the counterbored holes 221 and 222 in a manner similar to the tapered part 22a of the counterbored hole 22.

During production, as shown by thick arrows in FIG. 4, the optical fiber group FG1 is inserted into the copper pipe CP of the main tail cable MTC through the copper pipe CP1 of the branch tail cable BTC1 and the through hole 21 of the branch member 20. Similarly, the optical fiber group FG2 is inserted into the copper pipe CP of the main tail cable MTC through the copper pipe CP2 of the branch tail cable BTC2 and the through hole 21 of the branch member 20.

Therefore, in the example shown in FIG. 4, each of the paths connecting the copper pipes CP1 and CP2 to the copper pipe CP in the through hole 21 is smoothly formed into an arc in a plan view. With such a configuration, the bending of the optical fiber groups FG1 and FG2 can be suppressed.

In the example shown in FIG. 4, the diameter of the through hole 21 is formed larger than the inner diameters of the copper pipes CP1 and CP2, and the inner diameter of the copper pipe CP is formed larger than the diameter of the through hole 21. Thus, when the optical fiber groups FG1 and FG2 are inserted, the leading ends of the optical fiber groups FG1 and FG2 can be suppressed from being caught in the step between the inner peripheral surfaces of the copper pipes CP1 and CP2 and the through hole 21, and the step between the through hole 21 and the inner peripheral surface of the copper pipe CP.

The branch member 20 is strong enough to withstand water pressure at a depth of 8000 m, and is made of, for example, a steel material, copper, a copper alloy (e.g., beryllium copper alloy). In order to ensure airtightness, as described above, the branch member 20 is brazed to the copper pipe CP of the main tail cable MTC and the copper pipes CP1 and CP2 of the branch tail cables BTC1 and BTC2, respectively. Further, the branch member 20 protects the optical fiber groups FG1 and FG2 in a manner similar to the copper pipes CP, CP1, and CP2, and also functions as a power supply line.

In this way, the material of the branch member 20 is selected in consideration of strength, a brazing property with copper pipes, electric resistance, etc. Since the electric resistance of the copper pipe is dominant as the electric resistance of the entire power supply line, the electric resistance has a low priority in selecting the material of the branch member 20.

Furthermore, since it is difficult to machine the through hole 21 branched in a Y-shape, in the production of the branch member 20, the branch member 20 is produced, for example, by additive manufacturing using metal powder (so-called metal 3D printer).

As an example, the branch member 20 is produced by additive manufacturing using maraging steel powder. By using high-strength maraging steel, the branch member 20 can be made thinner (i.e., smaller and lighter). Moreover, by thinning the branch member 20, heat removal during brazing is suppressed, and the brazing material becomes easily melted, thereby improving the weldability. Since a steel material has higher strength than that of copper or copper alloy, the branch member 20 can be made thinner. Furthermore, since thermal conductivity of a steel material is low, heat removal during brazing can be suppressed. For example, a thickness of a part of the branch member 20 where the counterbored hole 22 to be brazed to the copper pipe CP is formed can be made 2 mm or less (e.g., 1.2 mm).

As shown in FIGS. 3 and 4, the branch member 20 has a smooth outer shape corresponding to the Y-shaped through hole 21. On the other hand, a part of the branch member 20 between the pair of counterbored holes 221 and 222 into which the copper pipes CP1 and CP2 are inserted, respectively, protrudes outward.

Here, as will be described in detail later, the branch member 20 is insulation-molded. At the time of insulation-molding, if a recess is formed between the counterbored holes 221 and 222, a void is likely to be formed. In the branch member 20 shown in FIGS. 3 and 4, since a part of the branch part 20 between the counterbored holes 221 and 222 protrudes outward, the formation of a void at the time of insulation-molding is suppressed, and a withstand voltage is improved.

As shown in FIG. 3, corner parts of the branch member 20 positioned at boundaries between an outer peripheral surface and an end surface are chamfered. At the time of insulation-molding, if a corner part is formed in the branch member 20, a void is likely to be generated in the corner part. In the branch member 20 shown in FIGS. 3 and 4, since the corner parts are chamfered, the formation of a void at the time of insulation-molding are reduced, and the withstand voltage is improved. Further, the electric field strength itself at the corner is reduced, and thus the withstand voltage is improved.

<Method of Producing Tail Cable>

Figure 5:
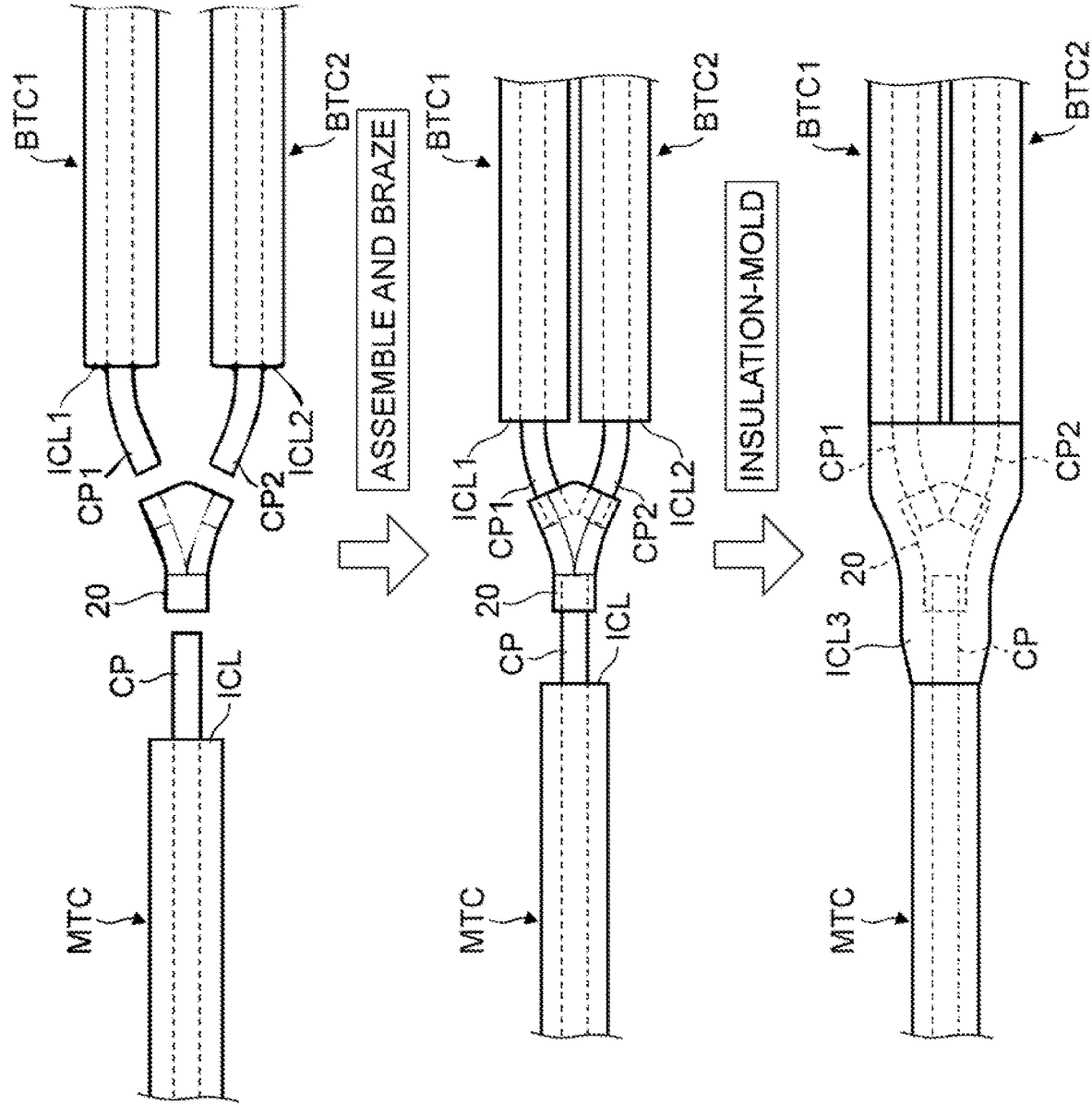
FIG. 5 is a plan view showing a method of producing a tail cable.

Next, a method of producing the tail cable will be described with reference to FIG. 5. FIG. 5 is a plan view showing the method of producing a tail cable. See also FIG. 4 as appropriate.

As described above, the tail cable is composed of the branch member 20, the main tail cable MTC, and the branch tail cables BTC1 and BTC2.

As shown in the upper row of FIG. 5, the main tail cable MTC includes the copper pipe CP having an outer peripheral surface coated with an insulating coating layer ICL. The branch tail cable BTC1 includes the copper pipe CP1 having an outer peripheral surface coated with an insulating coating layer ICL1. The branch tail cable BTC2 includes a copper pipe CP2 having an outer peripheral surface coated with an insulating coating layer ICL2. The insulating coating layers ICL, ICL1, and ICL2 are made of, for example, polyethylene.

First, as shown in the upper row of FIG. 5, the insulating coating layer ICL at one end of the main tail cable MTC inserted into the branch member 20 is removed to expose the copper pipe CP. The insulating coating layer ICL1 at one end of the branch tail cable BTC1 inserted into the branch member 20 is removed to expose the copper pipe CP1.

Similarly, the insulating coating layer ICL2 at one end of the branch tail cable BTC2 inserted into the branch member 20 is removed to expose the copper pipe CP2. In the example shown in FIG. 5, after the copper pipes CP1 and CP2 are inserted into the branch member 20, the exposed copper pipes CP1 and CP2 are made to curve in advance so that the branch tail cables BTC1 and BTC2 become parallel to each other.

Next, as shown in the middle row of FIG. 5, the copper pipes CP, CP1, and CP2 are inserted into the branch member 20, assembled, and brazed.

The details are as described with reference to FIG. 4.

Next, as shown in the lower row of FIG. 5, the branch member 20 and the exposed copper pipes CP, CP1, and CP2 are insulation-molded and covered with an insulating coating layer ICL3. During insulation-molding, the insulating coating layer ICL3 is integrated with the insulating coating layers ICL, ICL1, and ICL2. The insulating coating layer ICL3 is made of, for example, polyethylene in a manner similar to the insulating coating layers ICL, ICL1, and ICL2.

After that, as shown by the thick arrows in FIG. 4, the optical fiber group FG1 is inserted into the copper pipe CP of the main tail cable MTC through the copper pipe CP1 of the branch tail cable BTC1 and the through hole 21 of the branch member 20. Similarly, the optical fiber group FG2 is inserted into the copper pipe CP of the main tail cable MTC through the copper pipe CP2 of the branch tail cable BTC2 and the through hole 21 of the branch member 20.

In this way, the tail cable is produced. The tail cable has a withstand voltage of, for example, 15 kV or more by the insulating coating layers ICL, and ICL1 to ICL3. Further, the insulating coating layers ICL, and ICL1 to ICL3 can suppress corrosion of the copper pipes CP, CP1, and CP2 and the branch member 20, which are made of metal.

The whole or part of the example embodiments disclosed above can be described as, but not limited to, the following supplementary notes.

(Supplementary Note 1)

A submarine device comprising:

a main tail cable connected to a submarine cable;

a first branch tail cable including a first group of optical fibers among a plurality of optical fibers included in the main tail cable;

a second branch tail cable including a second group of optical fibers among the plurality of optical fibers;

a branch member configured to couple the main tail cable to the first and second branch tail cables and including therein a through hole for branching the plurality of optical fibers included in the main tail cable into the first group and the second group; and a device main body including a first introduction part for introducing the first branch tail cable into the device main body and a second introduction part for introducing the second branch tail cable into the device main body.

(Supplementary Note 2)

The submarine device according to Supplementary note 1, wherein the main tail cable includes a copper pipe covering the plurality of optical fibers, the first branch tail cable includes a copper pipe covering the first group of optical fibers, the second branch tail cable includes a copper pipe covering the second group of optical fibers, and one end parts of the copper pipes of the main tail cable and the first and second branch tail cables are brazed to respective open ends of the through hole of the branch member.

(Supplementary Note 3)

The submarine device according to Supplementary note 2, wherein a counterbored hole is provided at each of the open ends of the through hole of the branch member, the one end part of each of the copper pipes of the main tail cable and the first and second branch tail cables is inserted in and brazed to each of the counterbored holes.

(Supplementary Note 4)

The submarine device according to Supplementary note 3, wherein a tapered part having a diameter increased outward from an inner peripheral surface of each of the counterbored holes is provided at the open end of the counterbored hole of the through hole, and a brazing part is formed in each of the tapered parts.

(Supplementary Note 5)

The submarine device according to Supplementary note 3 or 4, wherein a part of the branch member between a pair of the counterbored holes into which the copper pipes of the first and second branch tail cables are inserted protrudes outwardly.

(Supplementary Note 6)

The submarine device according to any one of Supplementary notes 2 to 5, wherein a diameter of the through hole is larger than inner diameters of the copper pipes of the first and second branch tail cables, and an inner diameter of the copper pipe of the main tail cable is larger than the diameter of the through hole.

(Supplementary Note 7)

The submarine device according to any one of Supplementary notes 1 to 6, wherein a corner part positioned at a boundary between an outer peripheral surface and an end surface of the branch member is chamfered.

(Supplementary Note 8)

The submarine device according to any one of Supplementary notes 1 to 7, wherein the branch member is made of maraging steel.

(Supplementary Note 9)

A method of configuring a submarine device comprising:

branching a main tail cable connected to a submarine cable into a first branch tail cable including a first group of optical fibers among a plurality of optical fibers included in the main tail cable and a second branch tail cable including a second group of optical fibers among the plurality of optical fibers through a branch member;

introducing the first branch tail cable into a device main body through a first introduction part and introducing the second branch tail cable into the device main body through a second introduction part.

(Supplementary Note 10)

A submarine cable system comprising:

a submarine cable; and a submarine device connected to the submarine cable, wherein the submarine device comprises:

a main tail cable connected to a submarine cable;

a first branch tail cable including a first group of optical fibers among a plurality of optical fibers included in the main tail cable;

a second branch tail cable including a second group of optical fibers among the plurality of optical fibers;

a branch member configured to couple the main tail cable to the first and second branch tail cables and including therein a through hole for branching the plurality of optical fibers included in the main tail cable into the first group and the second group; and a device main body including a first introduction part for introducing the first branch tail cable into the device main body and a second introduction part for introducing the second branch tail cable into the device main body.

Although the present disclosure has been described with reference to the example embodiments, the disclosure invention is not limited by the above. The configuration and details of the present disclosure may be modified in various ways that will be understood by those skilled in the art within the scope of the disclosure.

This application claims priority on the basis of Japanese Patent Application No. 2020-059951, filed Mar. 30, 2020, the entire disclosure of which is incorporated herein by reference.

REFERENCE SIGNS LIST

10 DEVICE MAIN BODY
11 INTERNAL UNIT
12 PRESSURE-RESISTANT HOUSING
20 BRANCH MEMBER
21 THROUGH HOLE
22, 221, 222 COUNTERBORED HOLE
22a, 221a, 222a TAPERED PART
30 JOINT COVER
131, 132 INTRODUCTION PART
BTC1, BTC2 BRANCH TAIL CABLE
CP, CP1, CP2 COPPER PIPE
FG1, FG2 OPTICAL FIBER GROUP
ICL, ICL1 TO ICL3 INSULATING COATING LAYER
JB JOINT BOX
MTC MAIN TAIL CABLE
SC SUBMARINE CABLE

What is claimed is:

1. A submarine device comprising:

a main tail cable connected to a submarine cable;

a first branch tail cable including a first group of optical fibers among a plurality of optical fibers included in the main tail cable;

a second branch tail cable including a second group of optical fibers among the plurality of optical fibers;

a branch member configured to couple the main tail cable to the first and second branch tail cables and including therein a through hole for branching the plurality of optical fibers included in the main tail cable into the first group and the second group; and a device main body including a first introduction part for introducing the first branch tail cable into the device main body and a second introduction part for introducing the second branch tail cable into the device main body.

2. The submarine device according to claim 1, wherein the main tail cable includes a copper pipe covering the plurality of optical fibers, the first branch tail cable includes a copper pipe covering the first group of optical fibers, the second branch tail cable includes a copper pipe covering the second group of optical fibers, and one end parts of the copper pipes of the main tail cable and the first and second branch tail cables are brazed to respective open ends of the through hole of the branch member.

3. The submarine device according to claim 2, wherein
a counterbored hole is provided at each of the open ends of the through hole of the branch member,
the one end part of each of the copper pipes of the main tail cable and the first and second branch tail cables is inserted in and brazed to each of the counterbored holes.

4. The submarine device according to claim 3, wherein
a tapered part having a diameter increased outward from an inner peripheral surface of each of the counterbored holes is provided at the open end of the counterbored hole of the through hole, and
a brazing part is formed in each of the tapered parts.

5. The submarine device according to claim 3, wherein
a part of the branch member between a pair of the counterbored holes into which the copper pipes of the first and second branch tail cables are inserted protrudes outwardly.

6. The submarine device according to claim 2, wherein
a diameter of the through hole is larger than inner diameters of the copper pipes of the first and second branch tail cables, and an inner diameter of the copper pipe of the main tail cable is larger than the diameter of the through hole.

7. The submarine device according to claim 1, wherein
a corner part positioned at a boundary between an outer peripheral surface and an end surface of the branch member is chamfered.

8. The submarine device according to claim 1, wherein
the branch member is made of maraging steel.

9. A method of configuring a submarine device comprising:
branching a main tail cable connected to a submarine cable into a first branch tail cable including a first group of optical fibers among a plurality of optical fibers included in the main tail cable and a second branch tail cable including a second group of optical fibers among the plurality of optical fibers through a branch member; and
introducing the first branch tail cable into a device main body through a first introduction part and introducing the second branch tail cable into the device main body through a second introduction part.

10. A submarine cable system comprising:
a submarine cable; and
a submarine device connected to the submarine cable, wherein
the submarine device comprises:
a main tail cable connected to a submarine cable;
a first branch tail cable including a first group of optical fibers among a plurality of optical fibers included in the main tail cable;
a second branch tail cable including a second group of optical fibers among the plurality of optical fibers;
a branch member configured to couple the main tail cable to the first and second branch tail cables and including therein a through hole for branching the plurality of optical fibers included in the main tail cable into the first group and the second group; and
a device main body including a first introduction part for introducing the first branch tail cable into the device main body and a second introduction part for introducing the second branch tail cable into the device main body.

* * * * *